United States Patent
Tedesco

(10) Patent No.: US 9,958,615 B2
(45) Date of Patent: May 1, 2018

(54) MONOLITHIC ELEMENT AND SYSTEM FOR COLLIMATING OR FOCUSING LASER LIGHT FROM OR TO AN OPTICAL FIBER

(71) Applicant: Kaiser Optical Systems Inc., Ann Arbor, MI (US)

(72) Inventor: James M. Tedesco, Livonia, MI (US)

(73) Assignee: Kaiser Optical Systems Inc., Ann Arbor, MI (US)

( * ) Notice: Subject to any disclaimer, the term of this patent is extended or adjusted under 35 U.S.C. 154(b) by 0 days. days.

(21) Appl. No.: 15/410,206

(22) Filed: Jan. 19, 2017

(65) Prior Publication Data
US 2017/0131478 A1 May 11, 2017

Related U.S. Application Data

(62) Division of application No. 14/455,235, filed on Aug. 8, 2014.

(51) Int. Cl.
*G02B 6/32* (2006.01)
*G02B 6/42* (2006.01)
*G02B 6/36* (2006.01)
*G01J 3/02* (2006.01)
*G01J 3/44* (2006.01)

(52) U.S. Cl.
CPC ............. *G02B 6/32* (2013.01); *G01J 3/0208* (2013.01); *G01J 3/0218* (2013.01); *G01J 3/44* (2013.01); *G02B 6/3624* (2013.01); *G02B 6/4201* (2013.01)

(58) Field of Classification Search
CPC ............. G02B 6/32; G02B 6/322; G02B 3/02
USPC .......................................... 385/34
See application file for complete search history.

(56) References Cited

U.S. PATENT DOCUMENTS

| | | | | |
|---|---|---|---|---|
| 4,531,810 | A * | 7/1985 | Carlsen | G02B 6/32 385/137 |
| 5,568,578 | A * | 10/1996 | Ames | G02B 6/32 385/25 |
| 5,914,458 | A * | 6/1999 | Folsom | F42B 3/113 102/201 |
| 6,263,133 | B1 * | 7/2001 | Hamm | G02B 6/32 385/15 |
| 6,408,115 | B1 * | 6/2002 | McIntyre | G02B 6/2937 385/33 |
| 6,687,010 | B1 * | 2/2004 | Horii | G01B 9/0201 356/479 |
| 6,690,858 | B2 * | 2/2004 | Tsai | G02B 6/32 385/15 |

(Continued)

*Primary Examiner* — Kaveh C Kianni
(74) *Attorney, Agent, or Firm* — Christopher R. Powers; PatServe

(57) ABSTRACT

A monolithic optical element and system is used for collimating or focusing laser light from or to optical fibers. The optical fiber terminates in a tip that directly abuts against the first surface of the optical element. The optical element may provide a collimation or focusing function depending upon whether the abutting fiber delivers light for collimation or receives focused light from a collimated beam. The optical element may be a standard or modified barrel or drum lens, with the first and second surfaces being convex curved surfaces having the same or different radii of curvature. The end of the optical element to which the fiber abuts may have a diameter to match the inner diameter of a ferrule for positioning the fiber. A pair of the elements may be used for collimation and focusing in a Raman probehead or other optical detection system.

16 Claims, 4 Drawing Sheets

(56) References Cited

U.S. PATENT DOCUMENTS

| | | | | |
|---|---|---|---|---|
| 6,765,724 B1* | 7/2004 | Kramer | ................ | G02B 5/1866 356/328 |
| 6,907,149 B2* | 6/2005 | Slater | ................... | G01N 21/645 250/227.11 |
| 6,978,065 B2* | 12/2005 | Liu | ........................ | G02B 6/327 385/15 |
| 2002/0009261 A1* | 1/2002 | Bhagavatula | ........ | G02B 6/2552 385/35 |
| 2002/0076151 A1* | 6/2002 | Kinard | ..................... | G02B 6/32 385/33 |
| 2003/0004412 A1* | 1/2003 | Izatt | ...................... | A61B 5/0066 600/425 |
| 2003/0026540 A1* | 2/2003 | Fukuzawa | ............ | G02B 6/2937 385/34 |
| 2003/0081897 A1* | 5/2003 | Itoh | .......................... | G02B 3/04 385/34 |
| 2003/0175000 A1* | 9/2003 | Caracci | .................. | G02B 6/262 385/137 |
| 2004/0151466 A1* | 8/2004 | Crossman-Bosworth | | G02B 6/25 385/140 |
| 2005/0140971 A1* | 6/2005 | Yamaguchi | ....... | B01L 3/502715 356/246 |
| 2007/0019908 A1* | 1/2007 | O'Brien | ............... | G02B 6/3604 385/36 |
| 2012/0177327 A1* | 7/2012 | DeMeritt | ............... | G02B 6/327 385/74 |
| 2014/0099058 A1* | 4/2014 | Charbonneau-Lefort | | G02B 6/4214 385/33 |
| 2014/0143996 A1* | 5/2014 | Bhagavatula | ........ | G02B 3/0087 29/428 |
| 2014/0147078 A1* | 5/2014 | Bhagavatula | ............ | G02B 6/32 385/33 |

* cited by examiner

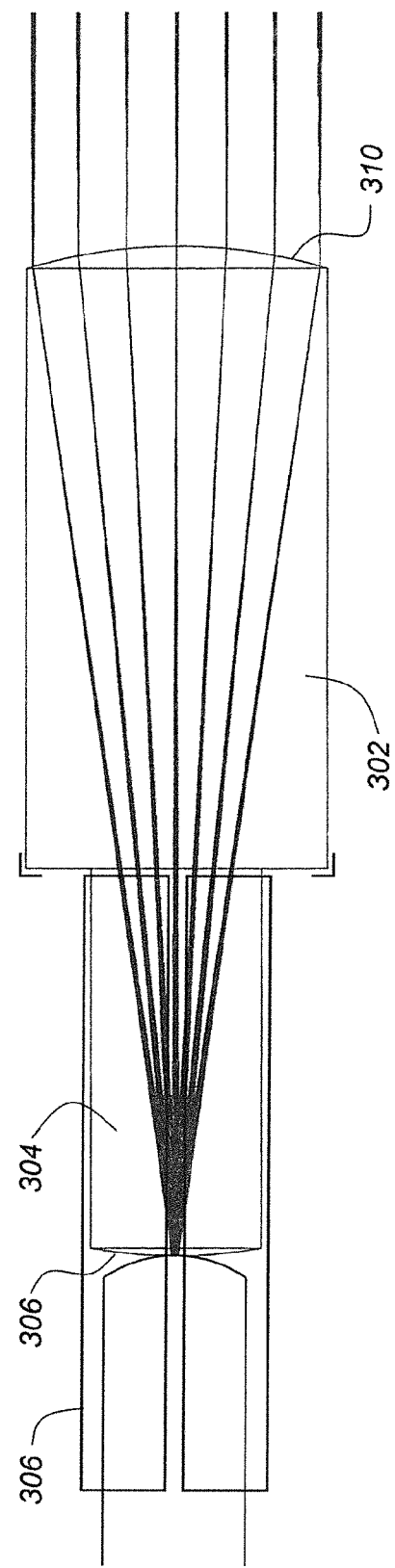

MONOLITHIC ELEMENT AND SYSTEM FOR COLLIMATING OR FOCUSING LASER LIGHT FROM OR TO AN OPTICAL FIBER

CROSS-REFERENCE TO RELATED APPLICATION

The present application is a divisional application of U.S. patent application Ser. No. 14/455,235, filed on Aug. 8, 2014, the entire contents of which are incorporated herein by reference.

TECHNICAL FIELD

This invention relates generally to optical systems and, in particular, to a monolithic optical element and system for collimating or focusing laser light from or to optical fibers in a Raman or other optical measurement probe, for example.

BACKGROUND

FIG. 1 is a simplified schematic diagram illustrating imaging optics used to collimate the light from an optical fiber 104. As is typical, the distal end of the fiber is spaced apart from the surface of lens 102 used for collimation. Not only does this arrangement require precise mechanical locating (and re-locating) to laterally and axially align the fiber relative to the lens, if the fiber is carrying high-power laser light, as might be the case with Raman probes, this results in a high energy density in the air space between the tip of the fiber and the imaging optics. As a result, couplings of this kind must be sealed and/or purged to meet safety or environmental requirements.

BRIEF SUMMARY

This invention relates generally to optical systems and, in particular, to a monolithic optical element and system for collimating or focusing laser light from or to optical fibers. Such a system includes a monolithic, homogenous glass optical element defining an optical axis with opposing first and second end surfaces. An optical fiber, terminating in a tip, is butted up against the first surface of the optical element to make intimate physical contact therewith.

The optical element may provide a collimation function by receiving light from the tip of the fiber and transmitting the light as a collimated beam from the second surface, or the element may provide a focusing function by focusing a collimated beam incident on the second surface to the tip of the fiber. The light being collimated or focused is confined substantially within the optical element, thereby eliminating the presence of high energy density light in any gap between the tip of the fiber and the first surface of the optical element where it may come into contact with combustible gases and potential contaminants.

The optical element may be a barrel or drum lens, with the first and second surfaces being convex curved surfaces having the same radius of curvature. Alternatively, the radius of curvature of the first surface may be different than the radius of curvature of the second surface, or even flat, to minimize mechanical stress concentration at the point of contact between the fiber ferrule and the lens. The length of the lens is chosen in conjunction with the refractive index of the lens material and the distal surface radius in order to generate zero back focal length, that is, perfect collimation out, or focusing of collimated light in, with the fiber in contact with the lens.

The optical element may alternatively be constructed in the form of a gradient index (GRIN) lens of appropriate length to produce the same effect of collimation or focusing with a fiber in optical contact, as is commonly practiced in devices for fiber optic telecommunications. With a GRIN lens, a spatial refractive index gradient performs the light bending instead of a curved air/glass interface. However, commonly available GRIN materials and lenses are only available in a very limited range of diameters, focal lengths and numerical apertures, making their adaptation to optical measurement probe designs impractical without major investment in custom GRIN lens design and fabrication.

The end of the optical element including the first surface has a diameter to match the inner diameter of a connector ferrule carrying the optical fiber. The system may include two of the optical elements, one acting as a light collimator, and the other acting as a light focusing element in a Raman measurement probe.

BRIEF DESCRIPTION OF THE DRAWINGS

FIG. 3 is a simplified drawing that illustrates a different embodiment of the invention utilizing a modified barrel or drum-type lens as a monolithic optical element;

DETAILED DESCRIPTION

This invention broadly uses a monolithic optic element to collimate or focus from/to an optical fiber with multiple advantages, including:
1) the elimination of high energy density hot spots and the components and assembly steps required for sealing and/or purging;
2) the elimination of various optical components as well as the machining required to hold and position such components in a housing; and
3) a dramatic reduction in the requirements for axial and lateral alignment of the fiber relative to the monolithic optic element, thereby simplifying fiber locating and relocating procedures.

Figure 2:
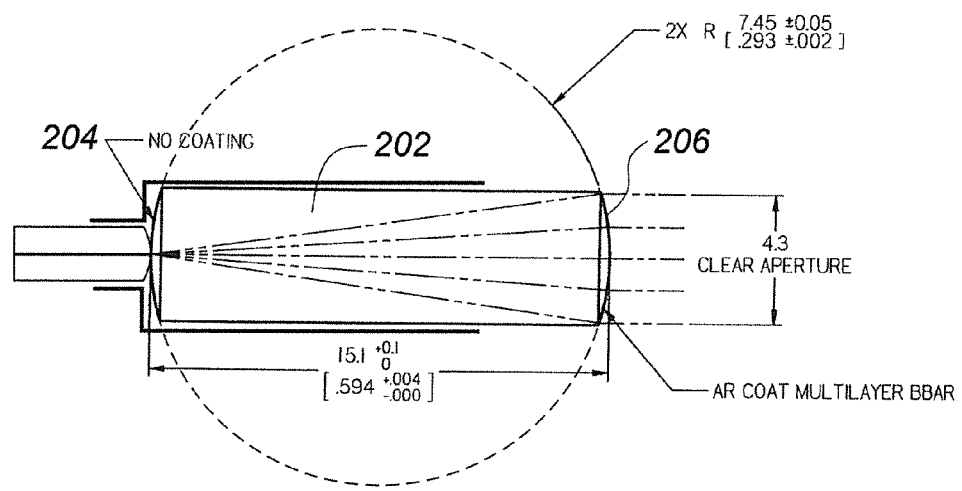
FIG. 2 is a simplified diagram illustrating a basic embodiment of the invention in a light collimating configuration.

FIG. 2 is a simplified diagram illustrating a basic embodiment of the invention in a light collimating configuration. The monolithic optic element 202 in this case may be a standard barrel or 'drum' lens, defined as a cylindrical plug taken from a glass sphere indicated by the broken-line circle. Such a sphere section produces most accurate collimation/focusing of a contacted fiber if the refractive index of the glass is 1.5, with the length of the lens being exactly twice the radius of each surface curvature. As such, the radii of the light-receiving and transmitting surfaces 204, 206 may be the same though not necessarily as discussed in conjunction with other embodiments described below, including the use of modified length and glass refractive index.

Using the monolithic optic element 202, the distal tip of optical fiber 208 may be butted up directly against light-receiving surface 204, thereby confining the high energy density light within the glass of the lens, eliminating hot spots that may otherwise be exposed to potential contaminants, condensates, or hazardous environments. The collimated beam emerging from the glass is of sufficiently low energy density to avoid the necessity of purging/sealing for safety reasons. Any appropriate assembly technique may be used to maintain the relative relationship of the fiber/lens. For example, particularly if element 202 is a straight cylinder with positioning shown, it may be potted into an assembly with a precision bore to receive a fiber ferrule. Other techniques may alternatively be used as described below. In a preferred embodiment, the lens and fiber ferrule may be mated with inexpensive fiber mating spring sleeves that are mass-produced for the telecommunications industry. The reader will appreciate that the configuration of FIG. 2 may be used for focusing purposes with surface 206 receiving incident collimated light that is focused onto the tip of a fiber with surface 204 acting as the transmitting side.

Figure 1:
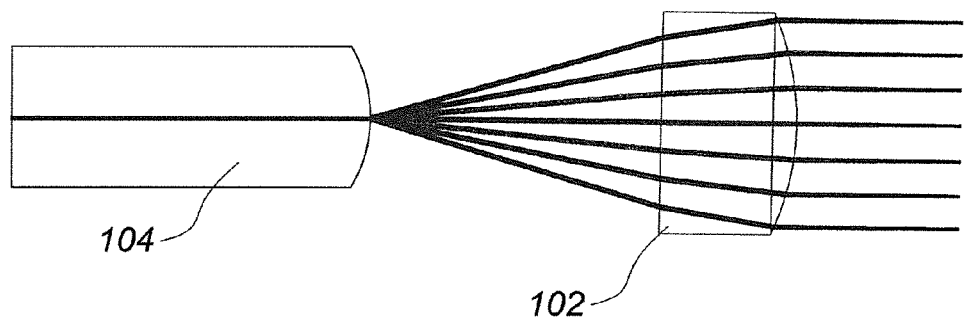
FIG. 1 s a simplified schematic diagram illustrating prior-art imaging optics used to collimate the light from an optical fiber.

FIG. 3 is a simplified drawing that illustrates a slightly different embodiment of the invention. In this case, monolithic optic element 302 departs further from a standard drum lens of FIG. 2. In particular, the element length is matched to the refractive index of the glass and the distal surface radius to ensure that contact with the optical fiber generates precise collimation (or focusing, as the case may be). Use of higher refractive index glass serves to minimize spherical aberration for a given effective focal length and numerical aperture. This, along with the fact that there is no air-glass interface to introduce aberration at the fiber end, can eliminate the necessity to use an expensive aspheric surface as is employed in the more traditional configuration of FIG. 1.

The element 302 further includes a stepped-down end 304 to match the diameter of a standard fiber ferrule 306 (a very inexpensive split cylindrical spring that provides ideal location and centering of the fiber 308 relative to the element 302). The stepped diameter allows generation of a longer focal length and larger collimated aperture relative to available cylindrical GRIN lenses and standard fiber ferrule/sleeve diameters. This can be required to reduce beam divergence, particularly with multimode fibers. Another departure is that the radius of surface 308 is not necessarily the same as that of surface 310. In fact, surface 308 may be flat by virtue of the intimate contact with the fiber 308; but instead, this surface is slightly curved to ensure reliable contact, but not so curved as to generate undesired stress that may chip the glass.

Figure 4A:
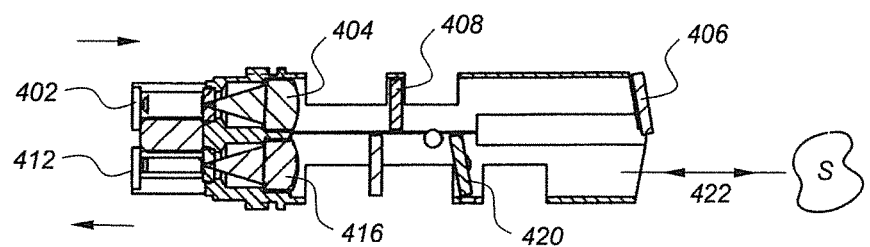
FIG. 4A is a cross section of an existing Raman probe manufactured by Kaiser Optical Systems of Ann Arbor, Mich. to which the invention is applicable.

FIG. 4A is a cross section of an existing Raman probe manufactured by Kaiser Optical Systems of Ann Arbor, Mich. to which the component of FIG. 3 is applicable. Such a probe is described in U.S. Pat. No. 6,907,149, entitled Compact optical measurement probe, the entire content of which is incorporated herein by reference. Excitation illumination is brought into the probe over fiber 402, which is then collimated by lens 404. The collimated light then passes through a bandpass filter 408 to remove the non-laser wavelengths generated en route from the source. The filtered light is reflected by a mirror 406 onto a beam combiner 420 which is then directed to a sample 'S' along a counter-propagating optical path 422. The light scattered by the sample thus returns along path 422, passes through beam combiner 420 in the reverse direction, and is filtered by an optional notch filter 416 before being focused by lens 414 onto the end of collection fiber 412.

Figure 5:
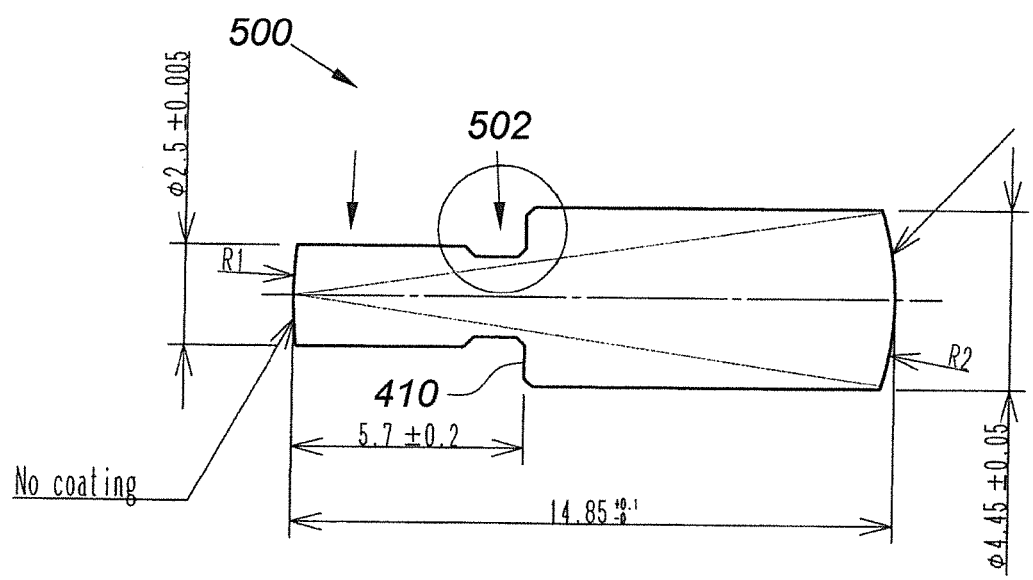
FIG. 5 is a detail drawing of a monolithic optical component applicable to the probe of FIG. 4 with dimensions.
Figure 4B:
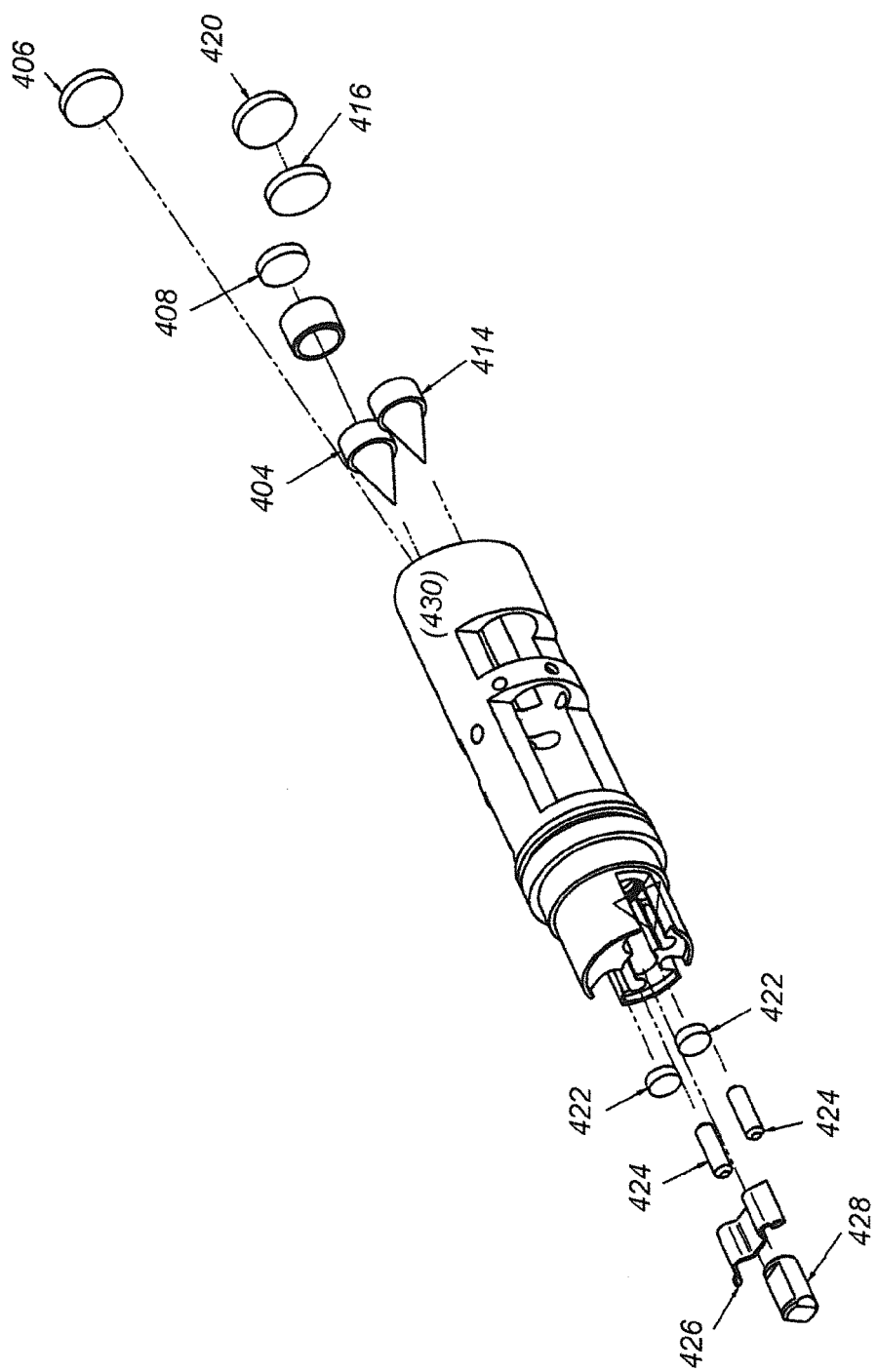
FIG. 4B is an exploded view of the probe configuration of FIG. 4A.

FIG. 4B is an exploded view of the probe configuration of FIG. 4A. The assembly further includes fiber input windows 422, dowel pins 428, "bat-wing" spring 426 to locate fiber optic ferrules (not shown), and modified dowel 428. FIG. 5 is a detail drawing of a monolithic optical component 500 applicable to the probe of FIG. 4 with dimensions. Optional relief region 502 is provided to ensure that the ferrule (not shown) "sees" a flat surface as opposed to a chamfer. Use of component 500 in the probe of FIG. 4 for both collimation and focusing functions eliminates windows 422, dowel pins 428, spring 426 and (aspheric) lenses 404, 414 for a significant reduction in parts count and manufacturing, alignment and maintenance costs.

The invention claimed is:

1. An optical measurement probe configured for interconnection to a first optical fiber for carrying excitation energy to the probe and to a second optical fiber for carrying collected energy from the probe for analysis, the probe comprising:
  a first monolithic optical component including a first cylindrical portion with a first incident surface for receiving light from an end of the first optical fiber and a second cylindrical portion with a first transmission surface outputting an expanded, collimated excitation beam for direction to a sample, wherein the first cylindrical portion has a diameter that is smaller than that of the second cylindrical portion, and wherein the first optical component further includes a first stepped transition region between the first cylindrical portion and the second cylindrical portion;
  a beam combiner for merging a collimated collection beam from the sample with the collimated excitation beam to produce a counter-propagating combined beam; and
  a second monolithic optical component including a third cylindrical portion with a second incident surface for receiving the combined beam and a fourth cylindrical portion with a second transmission surface structured to output a focused beam into an end of the second optical fiber, wherein the fourth cylindrical portion has a diameter that is smaller than that of the third cylindrical portion, and wherein the second optical component further includes a second stepped transition region between the third cylindrical portion and the fourth cylindrical portion, and
  wherein the end of the first optical fiber directly contacts the first incident surface of the first optical component and the end of the second optical fiber directly contacts the second transmission surface of the second optical component.

2. The optical probehead of claim 1, wherein the first optical component and the second optical component are modified barrel or drum lenses.

3. The optical probe of claim 1, wherein the first optical component and the second optical component are identical lenses.

4. The optical probe of claim 1, wherein the diameters of the first cylindrical portion and the fourth cylindrical portion are sized to complement the inner diameter of a ferrule receiving each respective optical fiber.

5. The optical probe of claim 1, wherein the excitation beam and the collection beam are respectively configured to induce and collect Raman scattering from the sample.

6. The optical probe of claim 1, wherein the first incident surface and the first transmission surface of the first optical component are convex curved surfaces, and/or the second incident surface and the second transmission surface of the second optical component are convex curved surfaces.

7. The optical probe of claim 6, wherein the first incident surface and the first transmission surface of the first optical component have the same radius of curvature, and/or the second incident surface and the second transmission surface of the second optical component have the same radius of curvature.

8. The optical probe of claim 6, wherein a radius of curvature of the first incident surface of the first optical component is larger than a radius of curvature of the first transmission surface of the first optical component.

9. The optical probe of claim 6, wherein a radius of curvature of the second incident surface of the second optical component is larger than a radius of curvature of the second transmission surface of the second optical component.

10. The optical probe of claim 1, wherein a diameter and a radius of curvature of the first transmission surface, a length, and a refractive index of the first optical component are selected in combination to produce exact collimation from a point on the center of a tip of the first optical fiber, and wherein a diameter and a radius of curvature of the second incident surface, a length, and a refractive index of the second optical component are selected in combination to produce exact focusing to a point on the center of a tip of the second optical fiber.

11. The optical probe of claim 10, wherein the refractive indices the first optical component and the second optical component are sufficiently high to minimize spherical aberration.

12. The optical probe of claim 1, wherein the first transmission surface of the first optical component and the second incident surface of the second optical component are aspheric.

13. The optical probe of claim 1, wherein the first optical component and the second optical component each forms a gradient index lens.

14. The optical probe of claim 1, wherein the probe is employed in a Raman measurement probe.

15. The optical probe of claim 1, wherein the stepped transition regions of the first optical component and the second optical component each include relief regions.

16. The optical probe of claim 15, wherein the relief regions each are embodied to facilitate a mating connection between the first optical component and a ferrule of the first optical fiber and between the second optical component and a ferrule of the second optical fiber.

* * * * *